(12) United States Patent
Fridlund (10) Patent No.: US 11,137,007 B2
(45) Date of Patent: Oct. 5, 2021

(54) SET OF PANELS FOR AN ASSEMBLED PRODUCT

(71) Applicant: Välinge Innovation AB, Viken (SE)

(72) Inventor: Magnus Fridlund, Ahus (SE)

(73) Assignee: VALINGE INNOVATION AB, Viken (SE)

( * ) Notice: Subject to any disclaimer, the term of this patent is extended or adjusted under 35 U.S.C. 154(b) by 100 days.

(21) Appl. No.: 16/703,077

(22) Filed: Dec. 4, 2019

(65) Prior Publication Data

US 2020/0102978 A1    Apr. 2, 2020

Related U.S. Application Data

(63) Continuation of application No. 15/422,798, filed on Feb. 2, 2017, now Pat. No. 10,544,818.

(30) Foreign Application Priority Data

Feb. 4, 2016    (SE) .................................... 1650135-5

(51) Int. Cl.
*F16B 12/26*        (2006.01)
*A47B 96/20*        (2006.01)
(Continued)

(52) U.S. Cl.
CPC ............ *F16B 12/26* (2013.01); *A47B 96/201* (2013.01); *F16B 12/125* (2013.01); *F16B 12/46* (2013.01);
(Continued)

(58) Field of Classification Search
CPC ............ A47B 47/0066; A47B 47/0091; A47B 96/201; A47B 2088/902; F16B 5/008;
(Continued)

(56) References Cited

U.S. PATENT DOCUMENTS

| 291,032 A | 1/1884 | Cleland |
| 634,581 A | 10/1899 | Miller |

(Continued)

FOREIGN PATENT DOCUMENTS

| AT | 400 611 B | 2/1996 |
| CH | 365 507 A | 11/1962 |

(Continued)

OTHER PUBLICATIONS

U.S. Appl. No. 14/573,572, filed Dec. 17, 2014, Christian Boo, (Cited herein as US Patent Application Publication No. 2015/0198191 A1 of Jul. 16, 2015).

(Continued)

*Primary Examiner* — Josh Skroupa
(74) *Attorney, Agent, or Firm* — Buchanan Ingersoll & Rooney P.C.

(57) ABSTRACT

A set of panels including a first panel with a first main plane and a second panel with a second main plane. A first edge of the first panel is configured to be locked to a second edge of the second panel, wherein the first main plane is essentially perpendicular to the second main plane, and wherein the first and the second edges are locked in a first direction, which is perpendicular to the first main plane, and a second direction, which is perpendicular to the second main plane. The first edge includes an edge tongue, with a longitudinal direction along the first edge, including a bottom edge, a first surface and an opposite second surface. The edge groove and/or the edge tongue is/are configured such that a greater force is absorbed by the longitudinal central part than by an edge part at third and fourth edges.

19 Claims, 8 Drawing Sheets

(51) Int. Cl.
*F16B 12/46* (2006.01)
*F16B 12/12* (2006.01)

(52) U.S. Cl.
CPC ... *F16B 2012/463* (2013.01); *F16B 2012/466* (2013.01)

(58) Field of Classification Search
CPC .... F16B 5/0012; F16B 5/0016; F16B 5/0614; F16B 12/12; F16B 12/125; F16B 12/26; E04F 2201/0104; E04F 2201/0115; E04F 2201/0138; E04F 2201/0146; E04F 2201/0523; Y10T 403/42; Y10T 403/7092; Y10T 403/7094; Y10T 403/7096; Y10T 403/73
USPC .................................. 403/205, 380–382, 403
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | MacKenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crovvder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |

(56) References Cited

U.S. PATENT DOCUMENTS

| | | |
|---|---|---|
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0121076 A1 | 4/2020 | Derelöv et al. |
| 2020/0214447 A1 | 7/2020 | Derelöv et al. |
| 2020/0300284 A1 | 9/2020 | Pervan |

(56) References Cited

U.S. PATENT DOCUMENTS

| | | |
|---|---|---|
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/138874 A1 | 8/2017 |
| WO | WO 2018/004435 A1 | 1/2018 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 15/308,872, filed Nov. 4, 2016, Darko Pervan, (Cited herein as US Patent Application Publication No. 2017/0089379 A1 of Mar. 30, 2017).

U.S. Appl. No. 15/432,190, filed Feb. 14, 2017, Magnus Fridlund, (Cited herein as US Patent Application Publication No. 2017/0234346 A1 of Aug. 17, 2017).

U.S. Appl. No. 15/642,757, filed Jul. 6, 2017, Peter Derelöv, (Cited herein as US Patent Application Publication No. 2017/0298973 A1 of Oct. 19, 2017).

U.S. Appl. No. 15/646,714, filed Jul. 11, 2017, Peter Derelöv, Hans Brännström and Agne Pålsson, (Cited herein as US Patent Application Publication No. 2018/0087552 A1 of Mar. 29, 2018).

U.S. Appl. No. 15/562,254, filed Sep. 27, 2017, Peter Derelöv, (Cited herein as US Patent Application Publication No. 2018/0080488 A1 of Mar. 22, 2018).

U.S. Appl. No. 15/567,507, filed Oct. 18, 2017, Christian Boo, Peter Derelöv and Agne Pålsson, (Cited herein as US Patent Application Publication No. 2018/0112695 A1 of Apr. 26, 2018).

U.S. Appl. No. 15/794,491, filed Oct. 26, 2017, Peter Derelöv, (Cited herein as US Patent Application Publication No. 2018/0119717 A1 of May 3, 2018).

U.S. Appl. No. 15/923,701, filed Mar. 16, 2018, Peter Derelöv, (Cited herein as US Patent Application Publication No. 2018/0202160 A1 of Jul. 19, 2018).

U.S. Appl. No. 15/956,949, filed Apr. 19, 2018, Peter Derelöv, (Cited herein as US Patent Application Publication No. 2019/0323535 A1 of Oct. 24, 2019).

(56) References Cited

OTHER PUBLICATIONS

U.S. Appl. No. 15/978,630, filed May 14, 2018, Jonas Fransson, Niclas Håkansson and Agne Pålsson, (Cited herein as US Patent Application Publication No. 2018/0328396 A1 of Nov. 15, 2018).
U.S. Appl. No. 16/228,975, filed Dec. 21, 2018, Niclas Håkansson and Darko Pervan, (Cited herein as US Patent Application Publication No. 2019/0113061 A1 of Apr. 18, 2019).
U.S. Appl. No. 16/220,574, filed Dec. 14, 2018, Peter Derelöv, (Cited herein as US Patent Application Publication No. 2019/0195256 A1 of Jun. 27, 2019).
U.S. Appl. No. 16/220,585, filed Dec. 14, 2018, Peter Derelöv, (Cited herein as US Patent Application Publication No. 2019/0191870 A1 of Jun. 27, 2019).
U.S. Appl. No. 16/361,609, filed Mar. 22, 2019, Peter Derelöv, Johan Svensson and Lars Gunnarsson, (cited herein as US Patent Application Publication No. 2019/0289999 A1 of Sep. 26, 2019).
U.S. Appl. No. 16/386,732, filed Apr. 17, 2019, Christian Boo, (Cited herein as US Patent Application Publication No. 2019/0323532 A1 of Oct. 24, 2019).
U.S. Appl. No. 16/386,810, filed Apr. 17, 2019, Christian Boo, (Cited herein as US Patent Application Publication No. 2019/0323533 A1 of Oct. 24, 2019).
U.S. Appl. No. 16/386,824, filed Apr. 17, 2019, Christian Boo, (Cited herein as US Patent Application Publication No. 2019/0320793 A1 of Oct. 24, 2019).
U.S. Appl. No. 16/386,874, filed Apr. 17, 2019, Peter Derelöv, (Cited herein as US Patent Application Publication No. 2019/0323534 A1 of Oct. 24, 2019).
U.S. Appl. No. 16/564,438, filed Sep. 9, 2019, Hans Brännström, Agne Pålsson and Peter Derelöv, (Cited herein as US Patent Application Publication No. 2020/0003242 A1 of Jan. 2, 2020).
U.S. Appl. No. 16/553,325, filed Aug. 28, 2019, Peter Derelöv and Johan Svensson, (Cited herein as US Patent Application Publication No. 2020/0069048 A1 of Mar. 5, 2020).
U.S. Appl. No. 16/553,350, filed Aug. 28, 2019, Peter Derelöv and Johan Svensson, (Cited herein as US Patent Application Publication No. 2020/0069049 A1 of Mar. 5, 2020).
U.S. Appl. No. 16/663,603, filed Oct. 25, 2019, Magnus Fridlund, (Cited herein as US Patent Application Publication No. 2020/0055126 A1 of Feb. 20, 2020).
U.S. Appl. No. 16/722,096, filed Dec. 20, 2019, Peter Derelöv and Christian Boo, (Cited herein as US Patent Application Publication No. 2020/0121076 A1 of Apr. 23, 2020).
U.S. Appl. No. 16/567,436, filed Sep. 11, 2019, Peter Derelöv and Mats Nilsson.
U.S. Appl. No. 16/697,335, filed Nov. 27, 2019, Christian Boo and Peter Derelöv.
U.S. Appl. No. 16/861,639, filed Apr. 29, 2020, Peter Derelöv.
U.S. Appl. No. 16/567,436, Derelöv.
U.S. Appl. No. 16/697,335, Boo et al.
U.S. Appl. No. 16/861,639, Derelöv et al.
International Search Report/Written Opinion dated Apr. 11, 2017 in PCT/SE2017/050086, ISA/SE, Patent-och registreringsverket, Stockholm, SE, 11 pages.
Extended European Search Report issued in EP Application No. 17747873.2, dated Jun. 21, 2019, European Patent Office, Munich, DE, 8 pages.
Derelöv, Peter, U.S. Appl. No. 16/567,436 entitled "Panels Comprising a Mechanical Locking Device and an Assembled Product Comprising the Panels," filed in the U.S. Patent and Trademark Office on Sep. 11, 2019.
Boo, Christian, et al., U.S. Appl. No. 16/697,335 entitled "Panels Comprising a Mechanical Locking Device and an Assembled Product Comprising the Panels," filed in the U.S. Patent and Trademark Office on Nov. 27, 2019.
Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.
U.S. Appl. No. 17/119,392, filed Dec. 11, 2020, Jimmie Bruno and Zoran Simunic.
U.S. Appl. No. 17/126,518, filed Dec. 18, 2020, Peter Derelöv.
U.S. Appl. No. 17/119,392, Bruno et al.
U.S. Appl. No. 17/126,518, Derelöv et al.
Bruno, Jimmie, et al. U.S. Appl. No. 17/119,392 entitled "Mechanical Locking System for Panels," filed in the U.S. Patent and Trademark Office on Dec. 11, 2020.
Derelöv, Peter, U.S. Appl. No. 17/126,518 entitled "Set of Panels with a Mechanical Locking Device," filed in the U.S. Patent and Trademark Office on Dec. 18, 2020.
U.S. Appl. No. 16/951,394, filed Nov. 18, 2020, Niclas Håkansson and Darko Pervan.
U.S. Appl. No. 16/953,608, filed Nov. 20, 2020, Peter Derelöv, Hans Brännström and Agne Pålsson.
U.S. Appl. No. 16/951,394, Håkansson et al.
U.S. Appl. No. 16/953,608, Derelöv et al.
Håkansson, Niclas, et al., U.S. Appl. No. 16/951,394 entitled "Mechanical Locking System for Building Panels," filed in the U.S. Patent and Trademark Office on Nov. 18, 2020.
Derelöv, Peter, et al., U.S. Appl. No. 16/953,608 entitled "An Assembled Product and a Method of Assembling the Product," filed in the U.S. Patent and Trademark Office on Nov. 20, 2020.
U.S. Appl. No. 16/946,047, filed Jun. 4, 2020, Darko Pervan.
U.S. Appl. No. 16/915,258, filed Jun. 29, 2020, Hans Brännström, Agne Pålsson and Peter Derelöv.
U.S. Appl. No. 16/946,047, Pervan.
U.S. Appl. No. 16/915,258, Brännström et al.
Pervan, Darko, U.S. Appl. No. 16/946,047 entitled "Mechanical Locking System for Building Panels," filed in the U.S. Patent and Trademark Office on Jun. 4, 2020.
Brännström, Hans, et al., U.S. Appl. No. 16/915,258 entitled "Assembled Product and Method of Assembling the Assembled Product," filed in the U.S. Patent and Trademark Office on Jun. 29, 2020.
U.S. Appl. No. 17/398,416, Thomas Meijer, filed Aug. 10, 2021.
Meijer, Thomas, U.S. Appl. No. 17/398,416 entitled "Panels with Edge Reinforcement," filed in the U.S. Patent and Trademark Office Aug. 10, 2021.

SET OF PANELS FOR AN ASSEMBLED PRODUCT

CROSS REFERENCE TO RELATED APPLICATIONS

The present application is a continuation of U.S. application Ser. No. 15/422,798, filed on Feb. 2, 2017, which claims the benefit of Swedish Application No. 1650135-5, filed on Feb. 4, 2016. The entire contents of U.S. application Ser. No. 15/422,798 and Swedish Application No. 1650135-5 are hereby incorporated herein by reference in their entirety.

TECHNICAL FIELD

Embodiments of the present invention relate to panels that are configured such that may be arranged perpendicular to each other and locked together. The panels may be assembled and locked together to obtain a furniture product, such as a bookshelf, a cupboard, a wardrobe, a box, a drawer or a furniture component. The locking may comprise a flexible tongue.

BACKGROUND OF THE INVENTION

A conventional furniture product may be assembled by a plurality of elements or panels. The panels may be assembled with a mechanical locking system, such as disclosed in, for example, WO 2012/154113 A1. The product comprises a first panel connected perpendicularly to a second panel by a mechanical locking system comprising, an edge tongue at the first panel, an edge groove at the second panel and a flexible tongue in an insertion groove.

In some situations, it may be desired to disassemble or dismantle the product after it has been assembled. WO 2015/038059 discloses a product assembled by a plurality of panels that are locked by a mechanical locking system comprising a flexible tongue in an insertion groove. The mechanical locking system may be unlocked by a dismantling tool, which pushes the flexible tongue into the insertion groove, which facilitates dismantling of the panels.

The panels are generally produced in a continuous production process, comprising a number of milling tools. The edge groove is for production reasons preferably extending contiguously from a front edge to a back edge of the second panel. An opening of the edge groove at the front edge may be covered by, e.g., a strip. The edge groove may have an opening at the back edge and a dismantling tool may be inserted through the opening. The opening at the back edge may also have the advantage that the first and the second panel may be assembled or disassembled by displacing the edge tongue relative the edge groove.

Embodiments of the present invention address a need to provide a locking with increased strength, particularly at a back edge comprising the opening of edge groove.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing a set of panels, shaped and configured to be locked together, wherein a greater force is absorbed by a central part than an edge part when a load applied to the first and/or the second panel.

A further object of embodiments of the invention is to provide a furniture product with increased strength and stability.

At least some of these and other objects and advantages that will be apparent from the description have been achieved by a set of panels comprising a first panel with a first main plane and a second panel with a second main plane. A first edge of the first panel is configured to be locked to a second edge of the second panel, wherein the first main plane is essentially perpendicular to the second main plane, and wherein the first and the second edges are locked in a first direction, which is perpendicular to the first main plane, and a second direction, which is perpendicular to the second main plane. The first edge comprises an edge tongue, with a longitudinal direction along the first edge, comprising a bottom edge, a first surface and an opposite second surface. The second edge comprises an edge groove, with a longitudinal direction along the second edge, comprising a bottom, a first surface and an opposite second surface. The edge tongue is configured to cooperate with the edge groove for locking together the first and the second edges in the first direction. The first surface of the edge tongue is configured to cooperate, at a longitudinal central part of the first edge and the second edge, with the first surface of the edge groove for said locking in the first direction. The first panel comprises a third edge which is adjacent to the first edge and the second panel comprises a fourth edge which is adjacent to the second edge. The edge groove is extending to the fourth edge. An opening of the edge groove at the fourth edge may have the disadvantage that a crack arises, at the fourth edge at an outer lower part of the edge groove when the load is applied. The edge groove and/or the edge tongue is/are configured such that a greater force is absorbed by the longitudinal central part than by an edge part of the first edge and the second edge at the third and fourth edges, when a load is applied to the first and/or the second panel, such that the arising of the crack may be prevented and to improve the strength of the locking.

The edge groove may have a first groove shape at the edge part and a second groove shape at the longitudinal central.

The edge tongue may have a first tongue shape at the edge part and a second tongue shape at the longitudinal central.

The edge part may have a longitudinal length in the range of about 5 mm to about to about 50 mm, preferably about 20 mm, in the longitudinal direction of the edge groove.

A third surface of the edge tongue may be configured to be at a distance, at said edge part, from a third surface of the edge groove, in a locked position of the first and the second edges. The distance is preferably in the range of about 0.2 mm to about 2 mm, preferably about 0.2 mm to about 0.5 mm. The third surface of the edge tongue may be at a same position, in the second direction, and on a same side of the edge tongue as the first surface of the edge tongue. The third surface of the edge groove may be at a same position, in the second direction, and on a same side of the edge groove as the first surface of the edge groove.

A first thickness of the edge tongue, at the longitudinal central part and at the first surface of the edge tongue, may be greater than a second thickness of the edge tongue. The second thickness may be at the edge part and at a same position, in the second direction, as the first thickness. The difference between the first thickness and the second thickness is preferably in the range of about 0.2 mm to about 2 mm, preferably about 0.2 mm to about 0.5 mm.

A first width of the edge groove, at the edge part, may be greater than a second width of the edge groove, at the longitudinal central part. The second width may be at the first surface of the edge groove and the first width may be at a same position, in the second direction, as the second width. The difference between the first width and the second width is preferably in the range of about 0.2 mm to about 2 mm, preferably about 0.2 mm to about 0.5 mm.

A second distance, which is between the bottom edge and the bottom and at the edge part, may be greater than a first distance, which may be between the bottom edge and the bottom and at the longitudinal central part, in a locked position of the first and the second edges.

The edge tongue may extend over the longitudinal central part and may end before the edge part.

The first surface of the edge tongue and the first surface of edge groove are preferably closer to an outer corner of the first and the second edges, in a locked position of the first and the second edges, than the second surface of the edge tongue and the second surface of the edge groove.

The edge tongue may comprise a tongue groove and the edge groove may comprise a tongue. Said tongue may be configured to cooperate with said tongue groove for locking together the first and the second edges in the second direction.

The tongue may be flexible tongue arranged in an insertion groove.

The flexible tongue is preferably displaceable in the insertion groove.

The insertion groove may extend along essentially the entire length of the edge groove.

The edge groove may extend along essentially the entire length of the second edge.

A core material of the first and the second panel may comprise a wood fibre based board, such as a HDF, MDF, plywood, solid wood or particleboard, or a reinforced plastic board or a wood fibre composite board.

The core may be provided with a decorative layer.

The third and the fourth edges may be back edges, such as back edges of a furniture product.

The first edge and the second edge may have a second edge part opposite the edge part.

The second edge part may have the same groove shape, and/or same the same tongue shape as the longitudinal central part A second aspect of the invention is a furniture product comprising the set of panels, according to the first aspect. The set of panels may be a part of a frame of the furniture product.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Embodiments are shown that may decrease the risk that a crack arises at joined portions of a first and a second panel.

Embodiments of the invention shown in FIG. 1A-7B comprise a set of panels comprising a first panel 4 with a first main plane and a second panel 2 with a second main plane. A first edge of the first panel is configured to be locked to a second edge of the second panel, wherein the first main plane is essentially perpendicular to the second main plane, and wherein the first and the second edges are locked in a first direction D1, which is perpendicular to the first main plane, and a second direction D2, which is perpendicular to the second main plane. The first edge comprises an edge tongue 22, with a longitudinal direction along the first edge, comprising a bottom edge 45, a first surface 43 and an opposite second surface 41. The second edge comprises an edge groove 21, with a longitudinal direction along the second edge, comprising a bottom 44, a first surface 42 and an opposite second surface 40. The edge tongue 22 is configured to cooperate with the edge groove 21 for locking together the first and the second edges in the first direction D1. The first surface 43 of the edge tongue 22 is configured to cooperate, at a longitudinal central part, with the first surface 42 of the edge groove 21 for said locking in the first direction D1. The first panel 4 comprises a third edge 65 which is adjacent to the first edge and the second panel 2 comprises a fourth edge 64 which is adjacent to the second edge. The edge groove 21 extends to the fourth edge 64. The edge groove 21 and/or the edge tongue 22 is/are configured such that a greater force is absorbed by the longitudinal central part 61 than by an edge part 62 at the third and fourth edges 63,64, when a load 58 is applied to the first and/or the second panel 4,2. The third and the fourth edges 63,64 may be back edges, such as back edges of a furniture product.

Figure 1A:
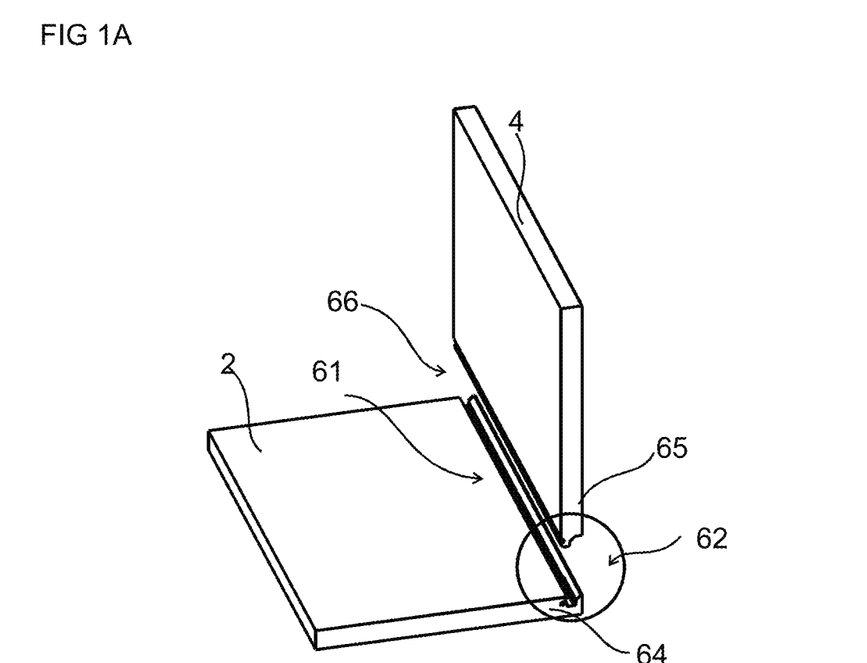
FIG. 1A shows a 3D-view of an embodiment of the invention
Figure 1B:
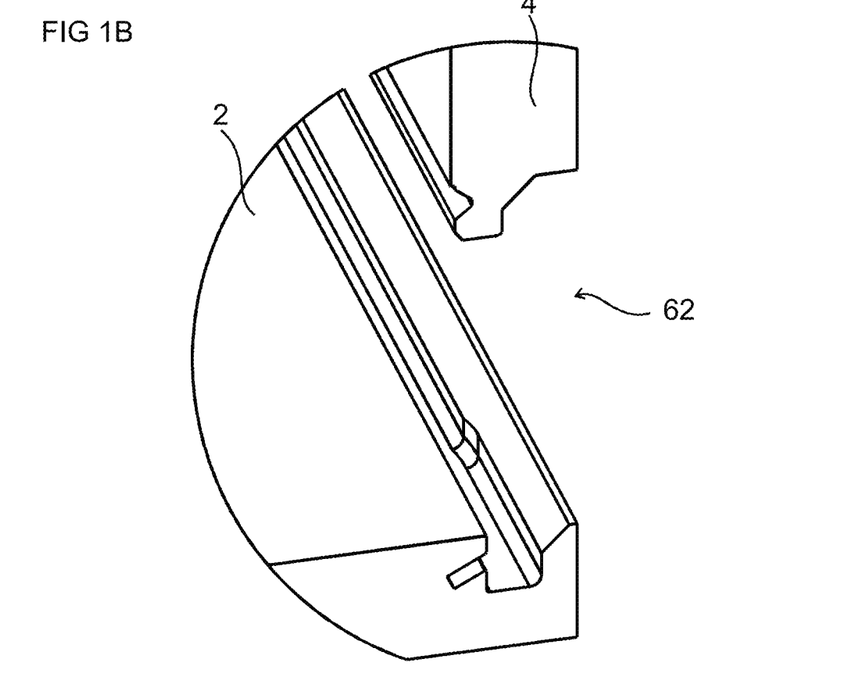
FIG. 1B shows an enlargement of the encircled area in FIG. 1A

FIG. 1A shows an embodiment of the edge groove which at the edge part 62 has a first groove shape and the longitudinal central part 61 has a second groove shape. The first groove shape comprises a width which is wider than a width of the second groove shape, at a corresponding position. The first edge and the second edge may have a second edge part 66 opposite the edge part 62. The second edge part 66 may have the same groove shape, and/or same the same tongue shape as the longitudinal central part 61. FIG. 1B shows an enlargement of the encircled area in FIG. 1A. The edge groove may be formed by displacing a milling tool along the second edge and displacing the milling tool in the first direction at the wider edge part. The edge tongue may have uniform shape in a longitudinal direction of the edge tongue. The edge part may have a longitudinal length in the range of about 5 mm to about 50 mm, preferably about 20 mm, in the longitudinal direction of the edge groove.

Figure 2A:
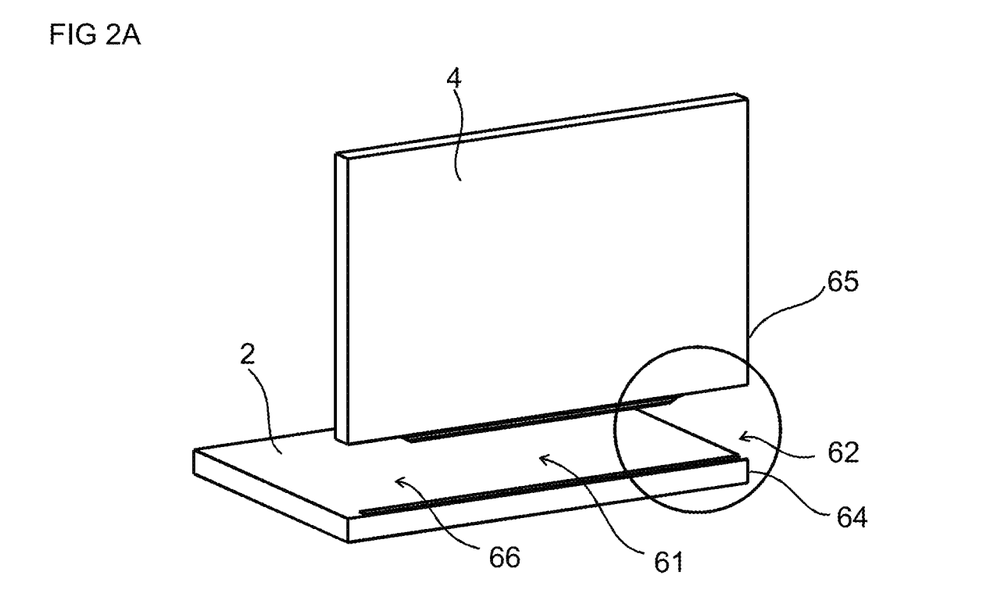
FIG. 2A shows a 3D-view of an embodiment of the invention
Figure 2B:
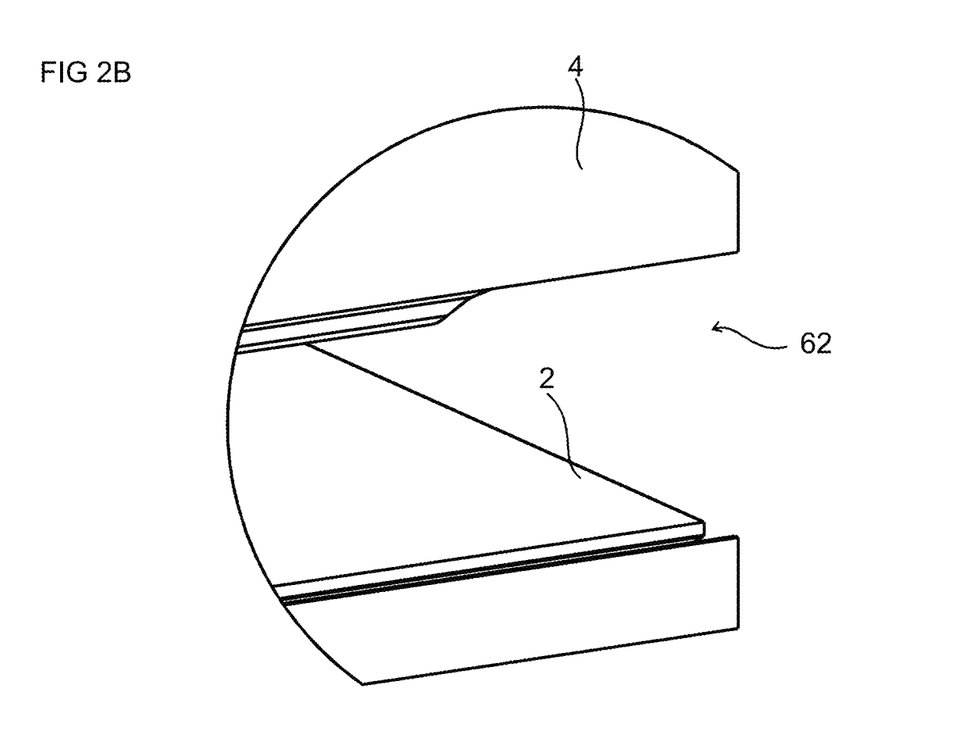
FIG. 2B shows an enlargement of the encircled area in FIG. 2A

FIG. 2A shows an embodiment of the edge tongue which is extending over longitudinal central part 61 and ends before the edge part 62. FIG. 2B shows an enlargement of the encircled area in FIG. 2A. The edge tongue may be formed by displacing a milling tool along the first edge and displacing the milling tool in the first direction at the edge part. The edge part may have a longitudinal length in the range of about 5 mm to about 50 mm, preferably about 20 mm, in the longitudinal direction of the edge tongue.

A second edge part 66, opposite the edge part 62, may have a shape different from the longitudinal central part 61 and the edge part 62. For example, the tongue shape, in the second edge part 66 may be essentially the same as the tongue shape in the edge part 62. However, the groove shape in the second edge part 66 may be different from the groove shape of either the longitudinal central part 61 or the edge part 62. For example, the groove in the second edge part 66 may not extent to the end of the edge. For example, the end of the groove may be about 5 mm to about 50 mm, preferably about 20 mm from the end of the second edge.

Figure 3A:
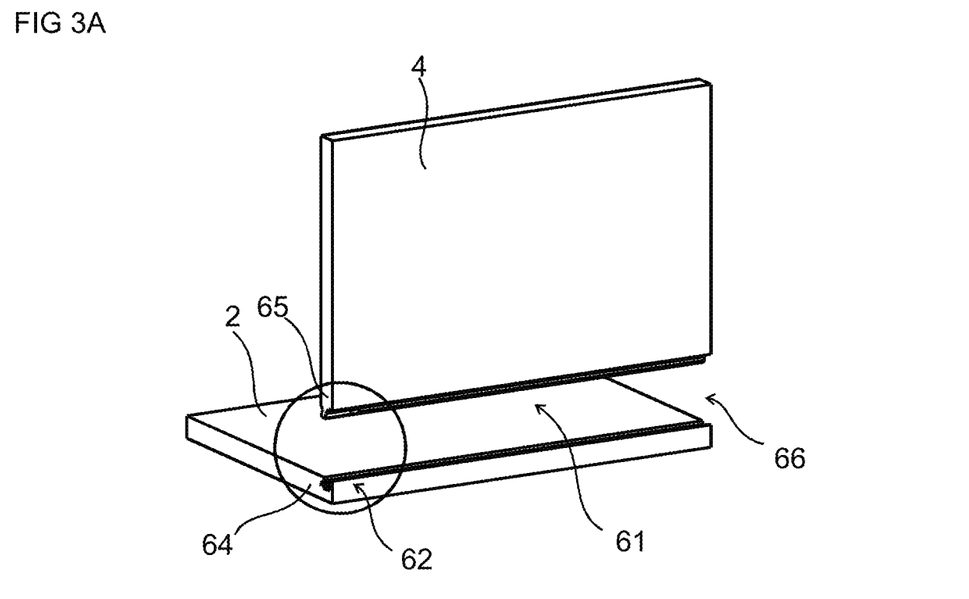
FIG. 3A shows a 3D-view of an embodiment of the invention
Figure 3B:
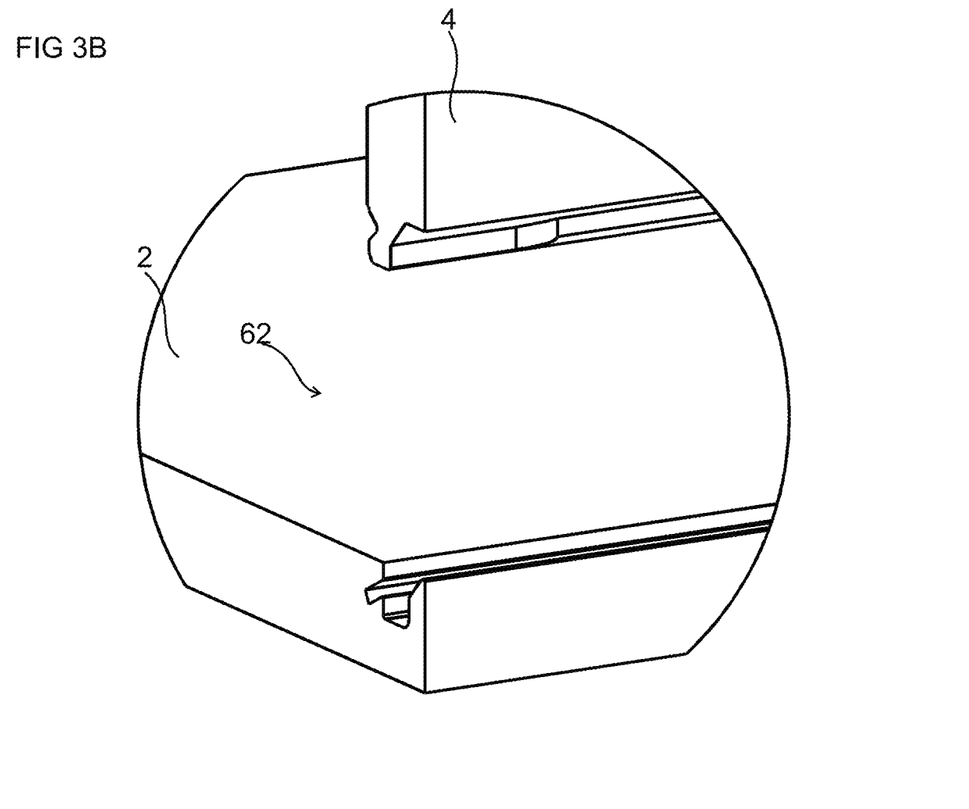
FIG. 3B shows an enlargement of the encircled area in FIG. 3A

FIG. 3A shows an embodiment of the edge tongue which at the edge part 62 has a first tongue shape and at the longitudinal central part 61 has a second tongue shape. The first tongue shape has a thickness which is thinner than a thickness of the second tongue shape, at a corresponding position. A second edge part 66, opposite the edge part 62, may have the same groove shape, and/or same the same tongue shape as the longitudinal central part 61. FIG. 3B shows an enlargement of the encircled area in FIG. 3A. The edge tongue may be formed by displacing a milling tool along the first edge and displacing the milling tool in the first direction at the thinner edge part. The edge groove may have a uniform groove shape in a longitudinal direction of the edge tongue. The edge part may have a longitudinal length in the range of about 5 mm to about 50 mm, preferably about 20 mm, in the longitudinal direction of the edge tongue.

Embodiments of the invention may provide advantage particularly for embodiments of the second panel comprising a core comprising fibres arranged essentially parallel to the second main plane. Such a second panel involves increased risk that a crack arises.

Figure 4A:
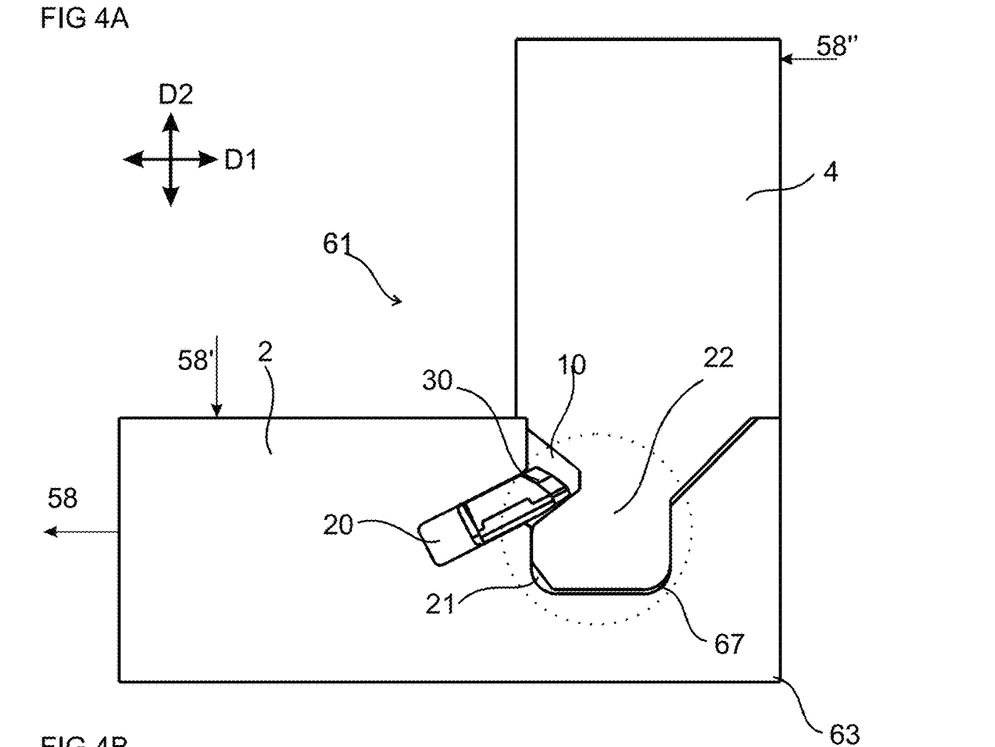
FIG. 4A shows crosscut of an embodiment of the longitudinal central part of an embodiment of the invention
Figure 4B:
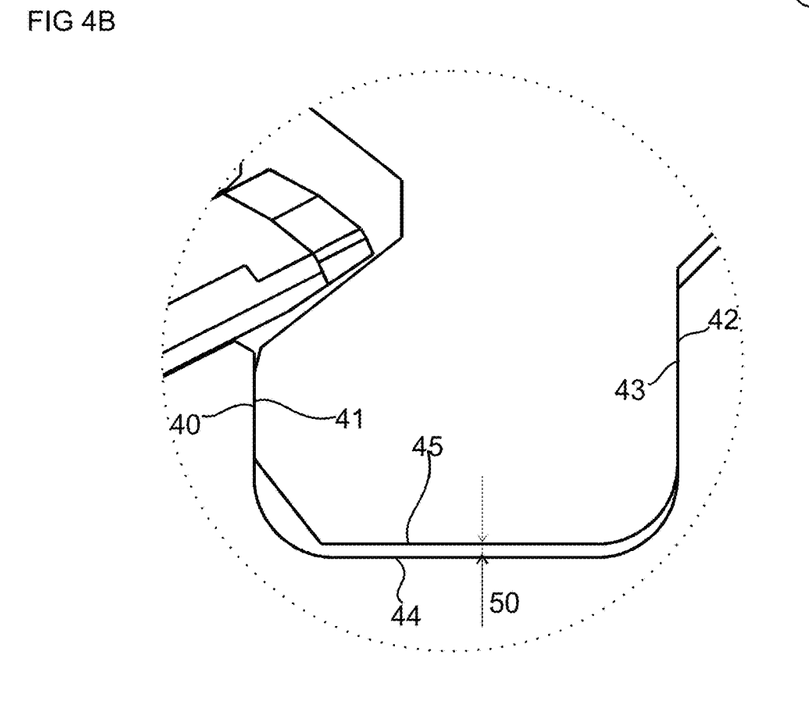
FIG. 4B shows an enlargement of the encircled area in FIG. 4A

FIG. 4A shows a crosscut of an embodiment of the longitudinal central part 61 comprising the first panel 4 and the second panel 2 in a locked position. FIG. 4B shows an enlargement of the encircled area in FIG. 4A. The first surface 43 of the edge tongue 22 and the first surface 42 of edge groove are closer to an outer corner 63 of the first and the second edges, than the second surface 41 of the edge tongue 22 and the second surface 40 of the edge groove 21. The bottom edge 45 and the bottom 44 are positioned at a first distance 50 from each other. FIG. 4B shows that the first surface 43 of the edge tongue 22 cooperates with the first surface 42 of the edge groove 21 for said locking in the first direction D1. The second surface 41 of the edge tongue 22 preferably cooperates with the second surface 40 of the edge groove 21 for a locking in the first direction D1. The greatest risk for a crack may be at a lower part 67 of the edge groove when a load 58, 58', 58" is applied to the first and/or second panel. The crack is more likely to arise at the fourth edge 64. The crack may thereafter propagate along the second edge. By lowering the load on the edge part of edge groove and the edge tongue an initiation of a crack may be prevented.

The edge tongue 22 may comprise a tongue groove 10 and the edge groove 21 comprises a tongue 30, said tongue is configured to cooperate with said tongue groove 10 for locking together the first and the second edges in the second direction D2.

The tongue is preferably a flexible tongue 30 which may be arranged in an insertion groove 20.

The insertion groove may 20 extend along essentially the entire length of the edge groove 21.

The flexible tongue 30 is preferably displaceable in the insertion groove 20.

The edge groove 21 may extend along essentially the entire length of the second edge.

Figure 5A:
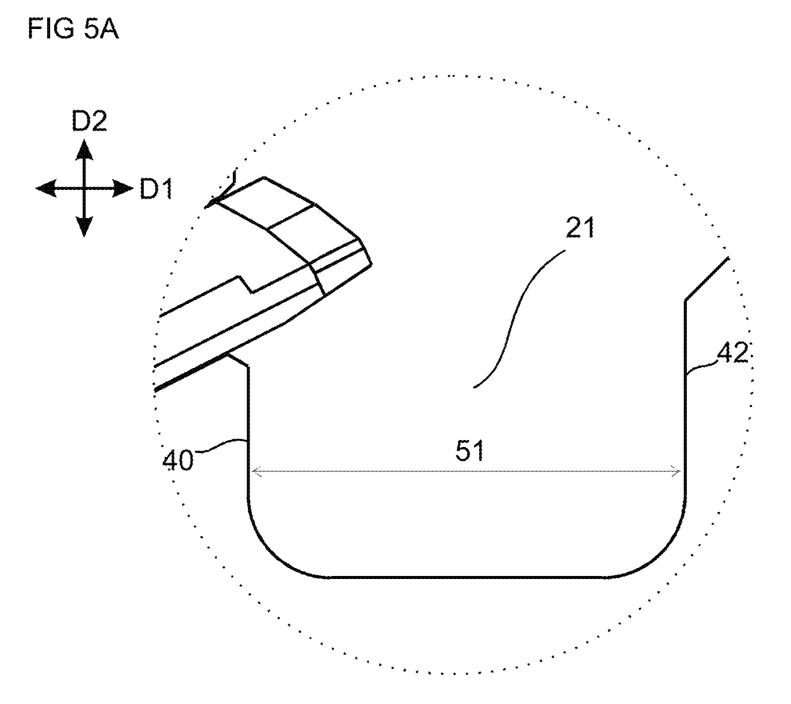
FIG. 5A shows the enlargement in FIG. 4A without the edge tongue

FIG. 5A shows an enlargement of the encircled area in FIG. 4A without the edge tongue. The embodiment comprises a second width 51 of the edge groove 21, at the longitudinal central part 61, at the first surface 42 of the edge groove 21.

Figure 5B:
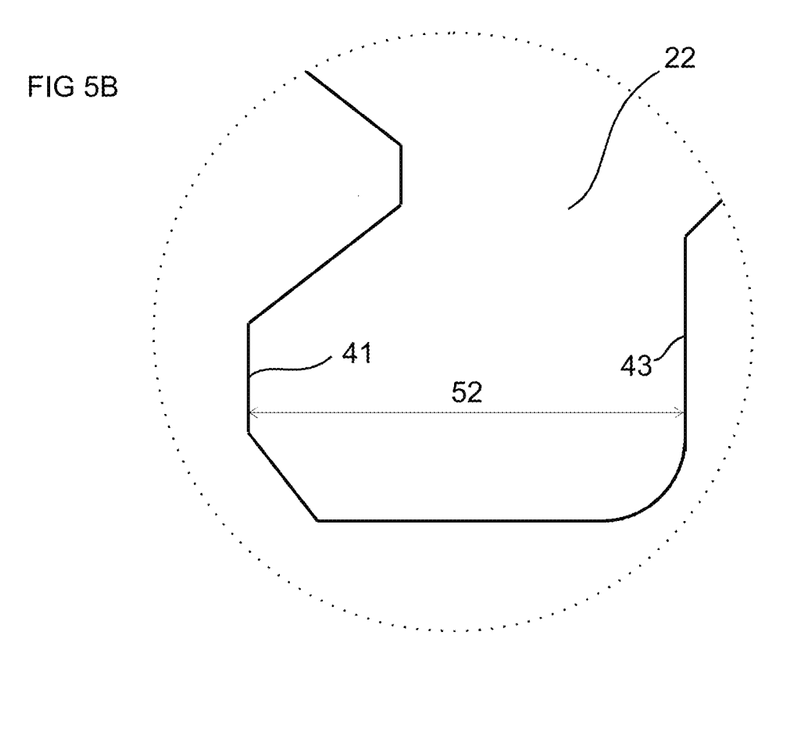
FIG. 5B shows the enlargement in FIG. 4A without the edge groove

FIG. 5B shows an enlargement of the encircled area in FIG. 4A without the edge groove. The embodiment comprises a first thickness 52 of the edge tongue 22, at the longitudinal central part and at the first surface 43 of the edge tongue 22.

Figure 6A:
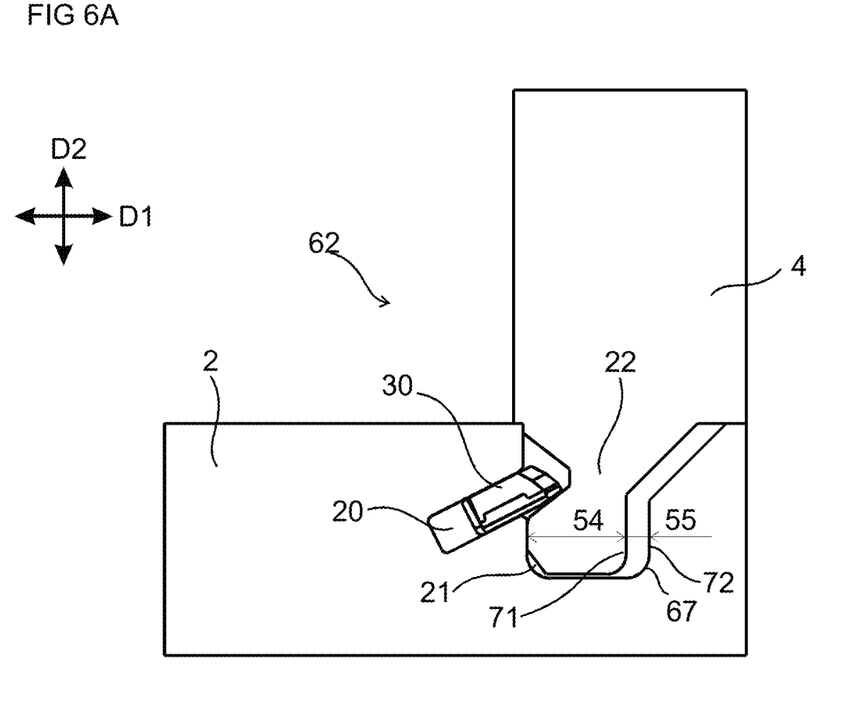
FIG. 6A-6B show embodiments of the edge part in a side view of an embodiment of the invention

An embodiment of the edge part 62 is shown in a crosscut in FIG. 6A. The embodiment comprises a second thickness 54 of the edge tongue 22 at the edge part and at a same position, in the second direction D2, as the first thickness 52, see FIG. 5B. The first thickness is greater than the second thickness. The difference between the first thickness 52 and the second thickness 54 is preferably in the range of about 0.2 mm to about 2 mm, preferably about 0.2 mm to about 0.5 mm.

Figure 6B:
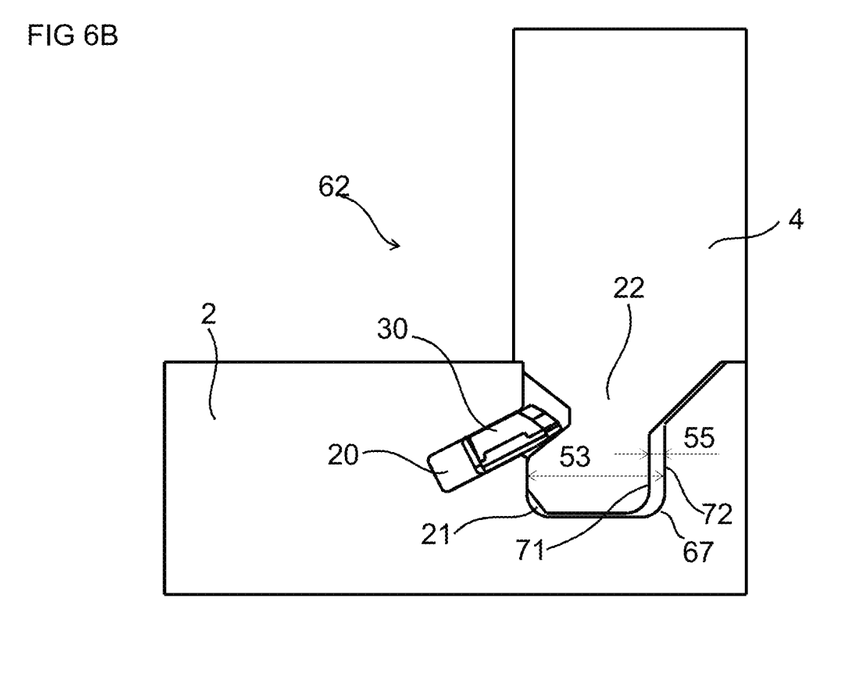

An embodiment of the edge part 62 is shown in a crosscut in FIG. 6B. The embodiment comprises a first width 53 of the edge groove 21, at the edge part 62. The first width 53 is greater than the second width 51 of the edge groove 21, at the longitudinal central part 61, see FIG. 5A. The first width 53 is at a same position, in the second direction D2, as the second width 51. The difference between the first width 53 and the second width 51 is may be in the range of about 0.2 mm to about 2 mm, preferably about 0.2 mm to about 0.5 mm.

The embodiments shown in FIG. 6A-6B comprises a third surface 71 of the edge tongue which is configured to be at a distance 55, at said edge part, from a third surface 72 of the edge groove, in a locked position of the first and the second edges. The distance is preferably in the range of about 0.2 mm to about 2 mm, preferably about 0.2 mm to about 0.5 mm. The third surface 71 of the edge tongue is at a same position, in the second direction D2, and on a same side of the edge tongue 22 as the first surface 43 of the edge tongue 22. The third surface 72 of the edge groove 21 is at a same position, in the second direction D2, and on a same side of the edge groove 21 as the first surface 42 of the edge groove 21.

Figure 7A:
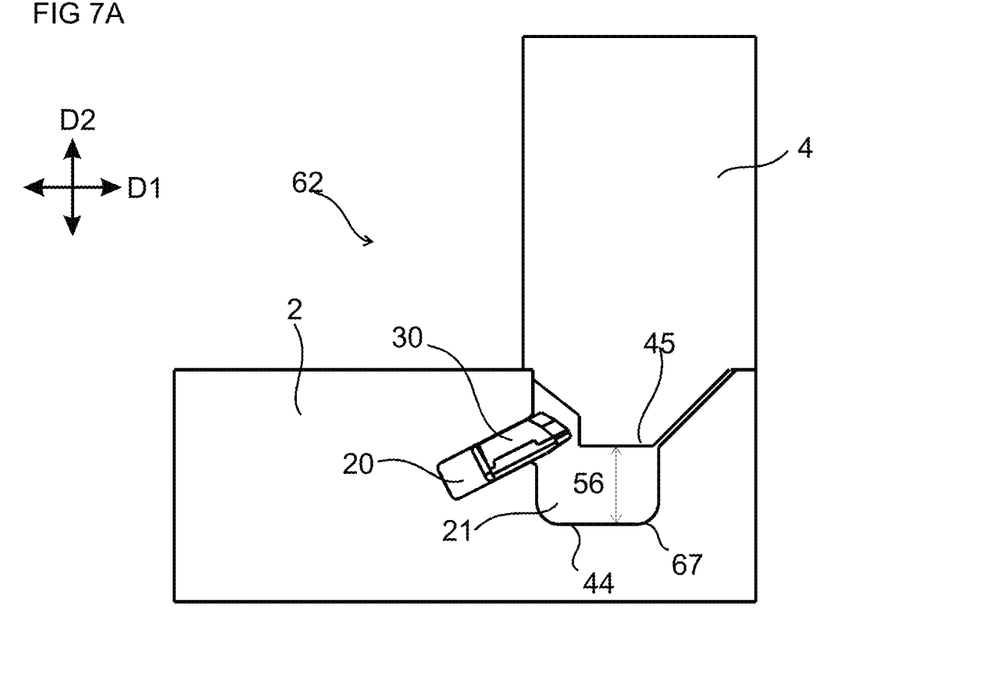
FIGS. 7A-7B show embodiments of the edge part in a side view of an embodiment of the invention

An embodiment of the edge part 62 is shown in a crosscut in FIG. 7A. The bottom edge 45 and the bottom 44 are positioned at a second distance 56 from each other. The second distance 56 is greater than the first distance 50, which is between the bottom edge and the bottom and at the longitudinal central part 61, see FIG. 4B, in a locked position of the first and the second edges.

Figure 7B:
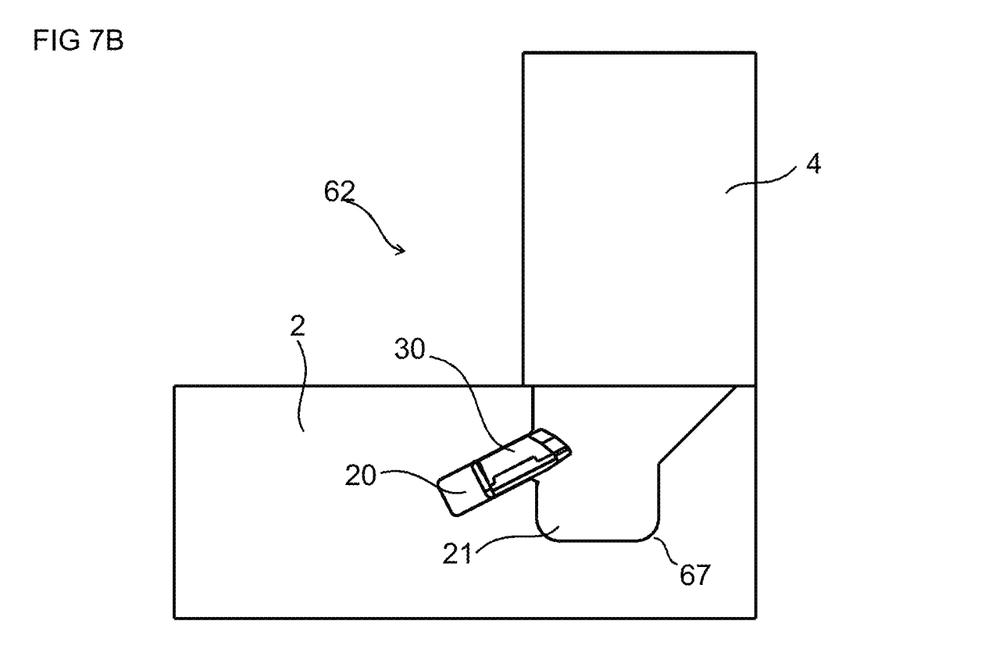

An embodiment of the edge part 62 is shown in a crosscut in FIG. 7B. In this embodiment the edge tongue is removed, preferably by a mechanical cutting, such as milling.

Figure 8A:
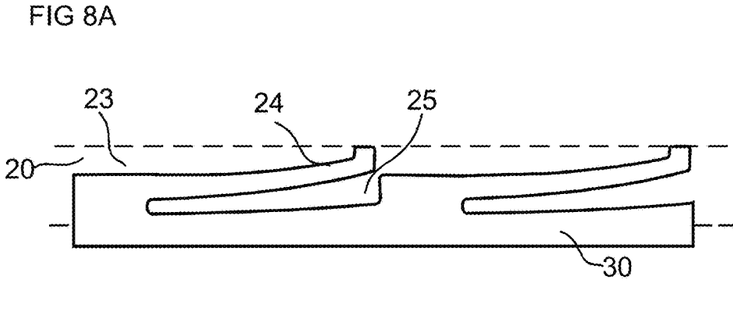
FIGS. 8A-8F show a part of the invention comprising an embodiment of the flexible tongue.
Figure 8B:
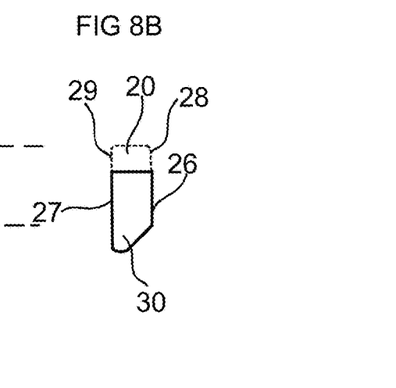
Figure 8C:
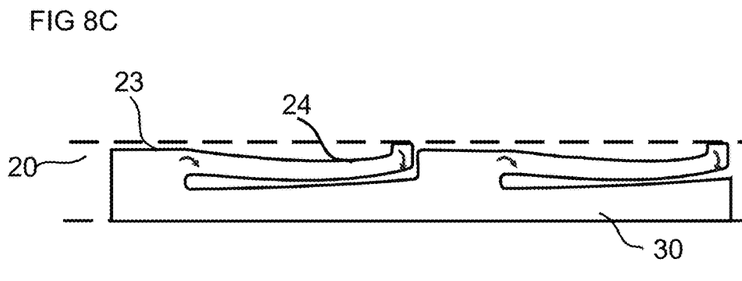
Figure 8D:
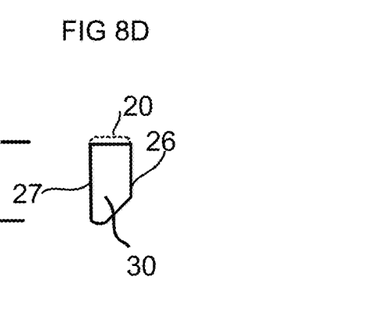

A core material of embodiments of the first and the second panel described above may comprise a wood fibre based board, such as a HDF, MDF, plywood, solid wood or particleboard, or a reinforced plastic board or a wood fibre composite board. The core may be provided with a decorative layer An embodiment of the flexible tongue 30, which is displaceable in an insertion groove 20, is shown in FIGS. 8A-D. FIGS. 8A-8B show the flexible tongue 30 in a locked portion and FIGS. 8C-8D show the flexible tongue 30 during assembling of the first panel 4 and the second panel 2. FIG. 8B shows a cross section of the flexible tongue 30 in FIG. 8A. FIG. 8D shows a cross section of the flexile tongue 30 in FIG. 8C. The flexible tongue 30 comprises bendable protruding parts 24. A space 23 is provided between the flexible tongue 30 and a bottom wall of the insertion groove 20. FIG. 8C shows that the flexible tongue 30 is pushed into the insertion groove 20 and towards the bottom wall of the insertion groove 20 during an assembly of the first panel 4 with the second panel 2. The flexible tongue 30 springs back toward its initial position when the first panel 4 and the second panel 8 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement locking surface 29, respectively, of the insertion groove 20.

Figure 8E:
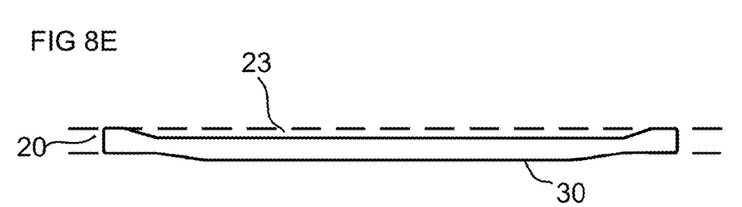
Figure 8F:
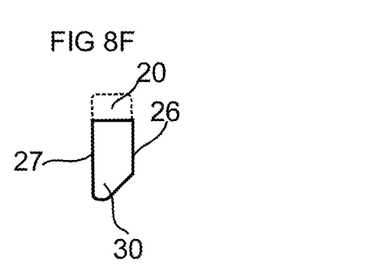

An alternative embodiment of the flexible tongue 30, without the protruding bendable parts 24, is shown in FIGS. 8E-8F. FIG. 8F shows a cross section of the flexible tongue 30 shown in FIG. 8E. The alternative embodiment is bendable in its length direction in order to accomplish a similar function as the embodiment shown in FIGS. 8A-8D.

The set of panels described above may be a part of a furniture product, such as a frame.

When the word "about" is used in this specification in connection with a numerical value, it is intended that the associated numerical value include a tolerance of ±10% around the stated numerical value.

EMBODIMENTS

1. A set of panels comprising a first panel (4) with a first main plane and a second panel (2) with a second main plane, wherein a first edge of the first panel is configured to be locked to a second edge of the second panel, wherein the first main plane is essentially perpendicular to the second main plane, and wherein the first and the second edges are locked in a first direction (D1), which is perpendicular to the first main plane, and a second direction (D2), which is perpendicular to the second main plane, wherein the first edge comprises an edge tongue (22), with a longitudinal direction along the first edge, comprising a bottom edge (45), a first surface (43) and an opposite second surface (41), wherein the second edge comprises an edge groove (21), with a longitudinal direction along the second edge, comprising a bottom (44), a first surface (42) and an opposite second surface (40), wherein the edge tongue (22) is configured to cooperate with the edge groove (21) for locking together the first and the second edges in the first direction (D1), characterized in:

that the first surface (43) of the edge tongue (22) is configured to cooperate, at a longitudinal central part of the first edge and the second edge, with the first surface (42) of the edge groove (21) for said locking in the first direction (D1), that the first panel (4) comprises a third edge (65) which is adjacent to the first edge and the second panel (2) comprises a fourth edge (64) which is adjacent to the second edge, that the edge groove (21) extends to the fourth edge (64), and that the edge groove (21) and/or the edge tongue (22) is/are configured such that a greater force is absorbed by the longitudinal central part (61) than by an edge part (62) of the first edge and the second edge at the third and fourth edges, when a load (58) is applied to the first and/or the second panel (4,2).

2. The set of panels as in embodiment 1, wherein the edge groove (21) has a first groove shape at the edge part (62) and a second groove shape at the longitudinal central (61), wherein the first groove shape is different from the second groove shape.

3. The set of panels as in embodiment 1 or 2, wherein the edge tongue (22) has a first tongue shape at the edge part (62) and a second tongue shape at the longitudinal central (61), wherein the first tongue shape is different from the second tongue shape.

4. The set of panels as in any one of the embodiments 1-3, wherein the edge part (62) has a longitudinal length in the range of about 5 mm to about 50 mm, preferably about 20 mm, in the longitudinal direction of the edge groove.

5. The set of panels as in any one of the embodiments 1-4, wherein a third surface (71) of the edge tongue is configured to be at a distance (55), at said edge part, from a third surface (72) of the edge groove, in a locked position of the first and the second edges, the distance is preferably in the range of about 0.2 mm to about 2 mm, preferably about 0.2 mm to about 0.5 mm, wherein the third surface (71) of the edge tongue is at a same position, in the second direction (D2), and on a same side of the edge tongue (22) as the first surface (43) of the edge tongue (22), and wherein the third surface (72) of the edge groove (21) is at a same position, in the second direction (D2), and on a same side of the edge groove (21) as the first surface (42) of the edge groove (21).

6. The set of panels as in any one of the embodiments 1-3, wherein a first thickness (52) of the edge tongue (22), at the longitudinal central part and at the first surface (43) of the edge tongue (22), is greater than a second thickness (54) of the edge tongue (22), at the edge part and at a same position, in the second direction (D2), as the first thickness (52), the difference between the first thickness and the second thickness is preferably in the range of about 0.2 mm to about 2 mm, preferably about 0.2 mm to about 0.5 mm.

7. The set of panels as in any one of the embodiments 1-4, wherein a first width (53) of the edge groove (21), at the edge part (62), is greater than a second width (51) of the edge groove (21), at the longitudinal central part (61), wherein the second width (51) is at the first surface (42) of the edge groove (21) and the first width (53) is at a same position, in the second direction (D2), as the second width (51), the difference between the first width (53) and the second width (51) is preferably in the range of about 0.2 mm to about 2 mm, preferably about 0.2 mm to about 0.5 mm.

8. The set of panels as in any one of the embodiments 1-5, wherein a second distance (56), which is between the bottom edge (45) and the bottom (44) and at the edge part (62), is greater than a first distance (50), which is between the bottom edge and the bottom and at the longitudinal central part (61), in a locked position of the first and the second edges.

9. The set of panels as in any one of the embodiments 1-2, wherein edge tongue (22) extends over the longitudinal central part (61) and ends before the edge part (62).

10. The set of panels as in any one of the embodiments 1-7, wherein the first surface (43) of the edge tongue (22) and the first surface (42) of edge groove are closer to an outer corner (63) of the first and the second edges, in a locked position of the first and the second edges, than the second surface (41) of the edge tongue (22) and the second surface (40) of the edge groove (21).

11. The set of panels as in any one of the embodiments 1-8, wherein the edge tongue (22) comprises a tongue groove (10) and the edge groove (21) comprises a tongue (30), said tongue is configured to cooperate with said tongue groove (10) for locking together the first and the second edges in the second direction (D2).

12. The set of panels as in embodiment 9, wherein the tongue is a flexible tongue (30) arranged in an insertion groove (20) 13. The set of panels as in embodiment 10, wherein the insertion groove (20) extends along essentially the entire length of the edge groove (21).

14. The set of panels as in embodiment 10 or 11, wherein the flexible tongue (30) is displaceable in the insertion groove (20).

15. The set of panels as in any one of the preceding embodiments, wherein the edge groove (21) extends along essentially the entire length of the second edge.

16. The set of panels as in any one of the preceding embodiments, wherein a core material of the first and the second panel comprises a wood fibre based board, such as a HDF, MDF, plywood, solid wood or particleboard, or a reinforced plastic board or a wood fibre composite board.

17. The set of panels as in embodiment 16, wherein the core is provided with a decorative layer.

The invention claimed is:

1. A set of panels for a furniture comprising a first panel with a first main plane and a second panel with a second main plane, wherein a first edge of the first panel is configured to be locked to a second edge of the second panel, wherein the first main plane is essentially perpendicular to the second main plane, and wherein the first and the second edges are locked in a first direction, which is perpendicular to the first main plane, and a second direction, which is perpendicular to the second main plane, wherein the first edge comprises an edge tongue, with a longitudinal direction along the first edge, comprising a bottom edge, a first surface and an opposite second surface, wherein the second edge comprises an edge groove, with a longitudinal direction along the second edge, comprising a bottom, a first surface and an opposite second surface, wherein the edge tongue is configured to cooperate with the edge groove for locking together the first and the second edges in the first direction, wherein:

the first surface of the edge tongue is configured to cooperate, at a longitudinal central part of the first edge and the second edge, with the first surface of the edge groove for said locking in the first direction, the first panel comprises a third edge which is adjacent to the first edge and the second panel comprises a fourth edge which is adjacent to the second edge, the edge groove extends to the fourth edge, the edge groove and/or the edge tongue is/are configured such that a greater force, is absorbed by the longitudinal central part than by an edge part of the first edge and the second edge at the third and fourth edges, when a load is applied to the first and/or the second panel, and a second distance, which is between the bottom edge and the bottom and at the edge part, is greater than a first distance, which is between the bottom edge and the bottom and at the longitudinal central part, in a locked position of the first and the second edges, wherein a core material of the first and the second panel comprises a wood fibre based board.

2. The set of panels as claimed in claim 1, wherein the edge groove has a first groove shape at the edge part and a second groove shape at the longitudinal central, wherein the first groove shape is different from the second groove shape.

3. The set of panels as claimed in claim 1, wherein the edge tongue has a first tongue shape at the edge part and a second tongue shape at the longitudinal central, wherein the first tongue shape is different from the second tongue shape.

4. The set of panels as claimed in claim 1, wherein the edge part has a longitudinal length in the range of about 5 mm to about 50 mm in the longitudinal direction of the edge groove.

5. The set of panels as claimed in claim 1, wherein a third surface of the edge tongue is configured to be at a distance, at said edge part, from a third surface of the edge groove, in a locked position of the first and the second edges, wherein the third surface of the edge tongue is at a same position, in the second direction, and on a same side of the edge tongue as the first surface of the edge tongue, and wherein the third surface of the edge groove is at a same position, in the second direction, and on a same side of the edge groove as the first surface of the edge groove.

6. The set of panels as claimed in claim 5, where the distance is in the range of about 0.2 mm to about 2 mm.

7. The set of panels as claimed in claim 1, wherein a first thickness of the edge tongue, at the longitudinal central part and at the first surface of the edge tongue, is greater than a second thickness of the edge tongue, at the edge part and at a same position, in the second direction, as the first thickness.

8. The set of panels as claimed in claim 7, wherein the difference between the first thickness and the second thickness is in the range of about 0.2 mm to about 2 mm.

9. The set of panels as claimed in claim 1, wherein a first width of the edge groove, at the edge part, is greater than a second width of the edge groove, at the longitudinal central part, wherein the second width is at the first surface of the edge groove and the first width is at a same position, in the second direction, as the second width.

10. The set of panels as claimed in claim 9, wherein the difference between the first width and the second width is in the range of about 0.2 mm to about 2 mm.

11. The set of panels as claimed in claim 1, wherein edge tongue extends over the longitudinal central part and ends before the edge part.

12. The set of panels as claimed in claim 1, wherein the first surface of the edge tongue and the first surface of edge groove are closer to an outer corner of the first and the second edges, in a locked position of the first and the second edges, than the second surface of the edge tongue and the second surface of the edge groove.

13. The set of panels as claimed in claim 1, wherein the edge tongue comprises a tongue groove and the edge groove comprises a tongue, said tongue is configured to cooperate with said tongue groove for locking together the first and the second edges in the second direction.

14. The set of panels as claimed in claim 13, wherein the tongue is a flexible tongue arranged in an insertion groove.

15. The set of panels as claimed in claim 14, wherein the insertion groove extends along essentially the entire length of the edge groove.

16. The set of panels as claimed in claim 14, wherein the flexible tongue is displaceable in the insertion groove.

17. The set of panels as claimed in claim 1, wherein the edge groove extends along essentially the entire length of the second edge.

18. The set of panels as claimed in claim 1, wherein the core material of the first and the second panel comprises a HDF, MDF, plywood, solid wood or particleboard, or a reinforced plastic board or a wood fibre composite board.

19. The set of panels as claimed in claim 18, wherein the core is provided with a decorative layer.

\* \* \* \* \*

UNITED STATES PATENT AND TRADEMARK OFFICE
CERTIFICATE OF CORRECTION

PATENT NO. : 11,137,007 B2
APPLICATION NO. : 16/703077
DATED : October 5, 2021
INVENTOR(S) : Magnus Fridlund It is certified that error appears in the above-identified patent and that said Letters Patent is hereby corrected as shown below:

In the Claims

Column 10, Lines 52-53, Claim 11:
"wherein edge tongue extends"

Should read:
-- wherein the edge tongue extends --

Signed and Sealed this
Twenty-third Day of April, 2024

Katherine Kelly Vidal
*Director of the United States Patent and Trademark Office*